Figure 1:
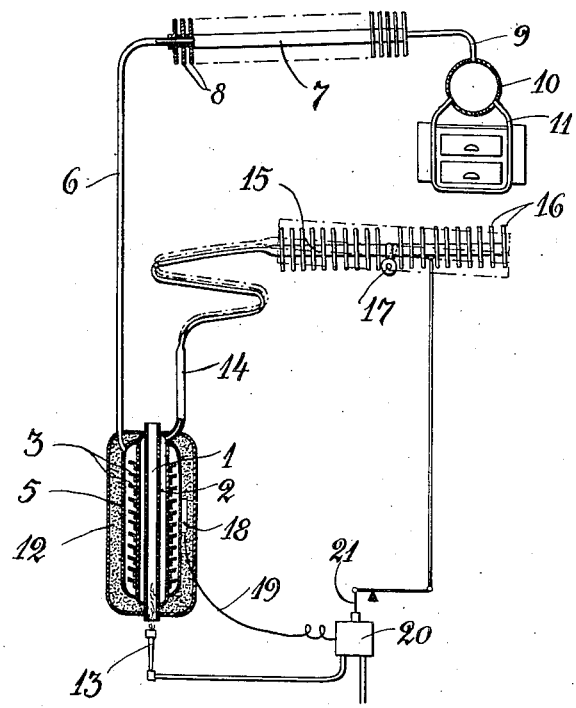

Nov. 7, 1933.    T. M. ELFVING    1,933,897

APPARATUS FOR TRANSFER OF HEAT

Filed Dec. 15, 1932

Inventor
Thore Martin Elfving
by
Busser & Harding
Attorneys

Patented Nov. 7, 1933

1,933,897

UNITED STATES PATENT OFFICE 1,933,897

APPARATUS FOR TRANSFER OF HEAT

Thore Martin Elfving, Stockholm, Sweden

Application December 15, 1932, Serial No. 647,389, and in Sweden December 21, 1931

12 Claims. (Cl. 62—118)

The following invention relates to the problem of regulating the transfer of heat or cold, for instance in conjunction with refrigerating apparatuses, refrigerators, or heating plants, where heat is to be transferred from one part or portion of the system to another part of the system or to a separate heat dissipating, or heat consuming device. Such so called indirect cooling systems will consist of a heat absorbing portion and a heat generating portion. The invention relates specifically to such systems where the heat given off to the heat absorbing portion is absorbed by means of evaporation of a liquid, which is then in gaseous state led to the heat generating portion, where condensation and heat liberation occurs. Such a heat transferring system can either be hermetically sealed or open to the atmosphere. It is often desirable with such systems to be able to interrupt the transfer of heat, i. e. when a certain temperature limit is attained, or when a continuation of the automatic action of the system for other reasons is no longer wanted. As an example where the heat transferring action should be periodically interrupted will be chosen the cooling of the boiler-absorber of an intermittent absorption refrigerating apparatus. In this example the system will have for its object to provide cooling means for the boiler-absorber during the absorption period, while during the heating period the heat dissipation from said boiler-absorber must obviously be reduced to a minimum. An indirect cooling system for this partcular purpose should preferably be of the hermetic type. It is known to control the action of such systems by means of valves and the like, inserted in the paths of circulation, so that the desired ceasing of the heat transportation can be brought about. The introduction of valves, etc., in a closed system will, however, cause an appreciable reduction in the reliability of the apparatus, due to the danger of leaks, aggravated on account of the pressure variations which will occur during each operating cycle.

The invention has now for its object a method of controlling the heat transferring action of this type of systems while obviating the use of valves or other analogous mechanical means. This end is attained, according to the invention, by making at least the heat generating portion of the automatic heat transferring system movable in such a way that the location, where the enclosed fluid upon condensation collects, is varied. According to the invention a variety of arrangements may be used. For instance may the heat generating portion be movable between two distinct limits or stops so that in one position the condensate is continuously returned by gravity to the heat absorbing portion while in the other position it is being retained in the heat generating portion. In the former case the system is at work, in the latter case the heat transfer will cease as the liquid is eventually evaporated and collected at a distance from the heated portion of the system. The invention will also make possible alternating the cooling action between a plurality of portions to be cooled. Two such portions may then be so connected to a common tubular heat dissipating portion that by changing the slope of said tubular portion the condensate will return to either the first or the second portion to be cooled. By this method the heat transferring action is switched to that portion where the condensate is being returned. It is also possible to arrange the heat dissipating portion in a mean position such that the condensate is returned, simultaneously to both of, or to none of, the heated portions, should so for operative reasons be desired. According to the invention it is possible to automatically control the heat transfer, by means of a thermostat or relay which subjects the heat generating portion to the desired motion.

As an example of application of the invention will hereinafter be described a cooling system for an intermittent absorption refrigerating unit. A second example will describe an embodiment comprising an absorption refrigerating plant where two intermittent units are to co-operate. In the latter example the cooling action is alternately applied to the boiler-absorbers, which is accomplished according to the invention by providing the boiler-absorbers with a hermetic cooling system in common, the heat dissipating tubular element of which has a variable slope so that the condensate is returned alternatively into heat exchange relation with the first or the second of the boiler-absorbers. That portion of the cooling system which is in heat exchange relation with the boiler-absorber being heated is thus caused to idle, while the rest of the system, due to the continuous evaporation and condensation of the enclosed fluid, is continually abstracting heat from the other boiler-absorber during its absorption period.

The cooling system can of course be arranged to dissipate the heat either to the air, by means of flanges, or to a cooling water circuit. The provisions for obtaining variation in the slope of the heat dissipating portion can also be modified in several ways, one embodiment of which will be hereinafter described.

Further advantages of the invention will be apparent from the following description in conjunction with the accompanying drawing, of which Figure 1 represents an intermittent absorption refrigerating apparatus having a cooling system for the boiler-absorber according to the invention.

Figure 2:
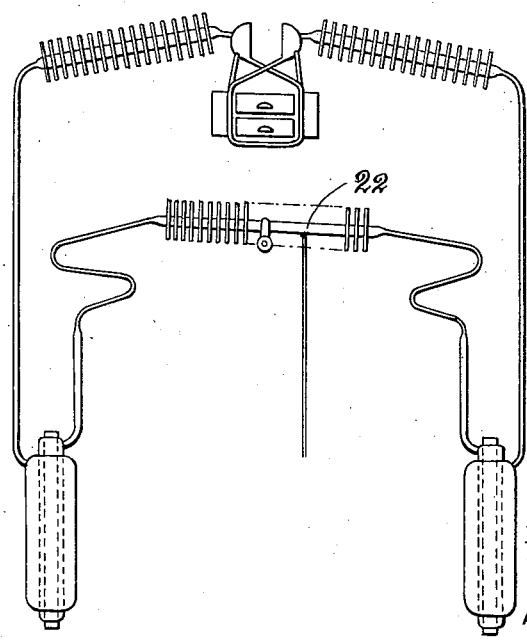

Figure 2 shows a combination of two alternating intermittent absorption refrigerating units having a cooling system according to the invention in common.

In Figure 1 the boiler-absorber of the apparatus has a central tube 1 surrounded by a cooling pocket 2. On the outside of said pocket are fastened a number of metal disks 3 for holding the absorption substance, which may consist of calcium chloride. Surrounding the whole is a shell 5 which completes the boiler-absorber. From this shell leads a pipe 6 to condenser 7, which in the figure is shown as air cooled by means of cooling flanges 8. From the condenser leads a pipe 9 to the evaporator, which consists of a main vessel 10 and a cooling loop 11. The enclosed refrigerant may consist of anhydrous ammonia. The boiler-absorber is fully insulated by means of insulation 12 and is heated by means of a gas flame 13. The heat transfer from the central tube to the surrounding tube 2 is preferably to be facilitated by means of interposed metal ribs, not shown in the figure. From the cooling pocket 2, which is hermetically separated from the refrigerating system proper extends upwardly a flexible pipe 14 to condenser 15, this secondary cooling system, comprising members 2, 14, and 15, being charged with a suitable condensible fluid, such as methyl chloride. A double conduit may be used alternatively to the single pipe 14 to avoid trapping of liquid. The amount of charge should preferably be such that the liquid, if allowed to collect in the cooling pocket alone, will completely fill said space. This secondary cooling system is also shown as air cooled by means of flanges 16, but may alternatively be cooled by water, in which case the water line has to be connected by means of flexible conduits. The condenser 15, which is the heat dissipating portion of the secondary cooling system, is pivoted at 17, so that its direction of slope can be varied. By turning condenser 15 in a clock-wise direction, to a position indicated by the dotted lines, it is obvious that the condensate will accumulate in the right hand portion of the condenser rather than return to the cooling pocket. The secondary cooling system can thus be rendered effective or non-effective as may be desired in each instance in response to a slight variation in the slope of the condenser 15. This variation may be accomplished automatically, i. e. by means of an ordinary thermostat, comprising a bulb 18 in thermal relation to shell 5, a capillary tubing 19, a bellows housing 20, and a mechanical member 21, responsive to the movements of the bellows, and connecting to condenser 15. The impulse of the thermostat can also be used for controlling the heat input to the boiler-absorber.

Figure 2 shows two intermittent refrigerating units of the same kind as has been described in conjunction with Figure 1, the cooling pockets of which are in open communication with a heat dissipating member 22 in common. The direction of slope of this member can be changed in an analogous manner, so that the condensate will gravitate towards that cooling pocket which is adjacent to the lowest end of member 22. Thus the cooling action will affect only one boiler-absorber at the time, while the other boiler-absorber will act as if not connected to the cooling system. The condenser 22 may even in this case be operated by means of a combined thermostat, which receives its impulses from bulbs located on both of the boiler-absorbers. When a certain predetermined temperature of the first boiler-absorber has been reached during the heating period, the thermostat is so arranged as to switch the heat supply to the second boiler-absorber, at the same time reversing the slope of the condensing element 22 in order to simultaneously switch the cooling action towards the first boiler-absorber. By this method a simple and safe working automatic coordination of the two units is accomplished, so that the cooling cycles will closely follow upon one another, giving a semi-continuous refrigeration effect as a result.

I claim:—

1. A refrigerating system having a secondary heat exchanger, comprising a circulating system for transfer of heat containing a volatile medium and comprising a hollow member arranged to receive heat and thereby to cause evaporation of said volatile medium, means for condensing and trapping said evaporated medium in another part of the system, and means for reversing the flow of said volatile medium to return the condensate to the hollow member by gravity.

2. A refrigerating system having a secondary heat exchanger, comprising a circulating system for transfer of heat containing a volatile medium and comprising a hollow member, a condenser arranged in open communication therewith, said hollow member being arranged to receive heat and thereby to cause evaporation of said volatile medium, and means for alternately trapping the condensate in the condenser and reversing the flow to return the condensate to the hollow member by gravity.

3. A circulating system for transfer of heat, comprising a first hollow member in open communication with a second hollow inclinatory member, the first hollow member being arranged to receive heat which is to be absorbed by causing evaporation of a volatile liquid contained in the system and again liberated by condensation in the second hollow member, and means for varying the inclination of said second hollow member.

4. A circulating system for transfer of heat, comprising a first hollow member in open communication with a second hollow inclinatory member, the first hollow member being arranged to receive heat which is to be absorbed by causing evaporation of a volatile liquid contained in the system and again liberated by condensation in the second hollow member and means for tilting the second hollow member between two predetermined positions, the first position allowing the condensate to return by gravity to the first hollow member while in the second position the condensate is retained in the second hollow member.

5. A circulating system for transfer of heat, comprising a plurality of cooling pockets in open communication with a condensing element in common, said system being partly filled with a volatile liquid, and means for directing the gravity flow of condensate from the condensing element to one of said cooling pockets at a time.

6. A refrigerating system having a secondary heat exchanger, comprising a circulating system for transfer of heat containing a volatile medium and comprising a hollow member arranged to receive heat and thereby to cause evaporation of said volatile medium, means for condensing and trapping said evaporated medium in another part of the system, and thermostatically controlled means for reversing the flow of said volatile medium to return the condensate to the hollow member by gravity.

7. In combination a circulating system for transfer of heat, comprising a cooling pocket and a condensing element, said system being partially filled with a volatile liquid, an intermittent absorption refrigerating system, means establishing a heat exchanging connection between the boiler-absorber of said refrigerating machine and said cooling pocket, and means for trapping and reversing the flow of the condensate to return it from said condensing element to said cooling pocket by gravity.

8. In combination a circulating system for transfer of heat, comprising a cooling pocket and a condensing element, said system being partially filled with a volatile liquid, an intermittent absorption refrigerating system, means establishing a heat exchanging connection between the boiler absorber of said refrigerating machine and said cooling pocket, means for trapping and reversing the flow of the condensate from said condensing element to said cooling pocket, and a thermostat for controlling the reversal of the flow of condensate.

9. In combination a circulating system for transfer of heat, comprising a cooling pocket and a condensing element, said system being partially filled with a volatile liquid, an intermittent absorption refrigerating system, means establishing a heat exchanging connection between the boiler-absorber of said refrigerating machine and said cooling pocket, means including an inclinatory member of the circulating system for causing condensate to return normally by gravity to said cooling pocket, and means for varying the inclination of said inclinatory member.

10. In a combination a circulating system for transfer of heat, comprising a cooling pocket and an inclinatory condensing element, said system being partly filled with a volatile liquid, a thermostat responsive to variations in the cooling pocket temperature, said thermostat being arranged to cause a variation in the inclination of the condensing element.

11. In a combination, a circulating system for transfer of heat, comprising a cooling pocket and an inclinatory condensing element, said system being partially filled with a volatile liquid, an intermittent absorption refrigerating system having a boiler-absorber in heat exchange relation to said cooling pocket, and means for varying the inclination of said condensing element.

12. In a combination, a circulating system for transfer of heat, comprising two cooling pockets and a condensing element in common, said system being partially filled with a volatile liquid, two intermittent absorption refrigerating systems each having a boiler-absorber in heat exchange relation to said cooling pockets, and means for directing the gravity flow of the condensate to one of said cooling pockets at a time.

THORE MARTIN ELFVING.